US009007438B2

(12) United States Patent
Mestha et al.

(10) Patent No.: US 9,007,438 B2
(45) Date of Patent: Apr. 14, 2015

(54) 3D IMAGING USING STRUCTURED LIGHT FOR ACCURATE VEHICLE OCCUPANCY DETECTION

(75) Inventors: Lalit Keshav Mestha, Fairport, NY (US); Yonghui Zhao, Penfield, NY (US)

(73) Assignee: Xerox Corporation, Norwalk, CT (US)

(*) Notice: Subject to any disclaimer, the term of this patent is extended or adjusted under 35 U.S.C. 154(b) by 418 days.

(21) Appl. No.: 13/476,334

(22) Filed: May 21, 2012

(65) Prior Publication Data
US 2013/0307932 A1 Nov. 21, 2013

(51) Int. Cl.
*H04N 7/18* (2006.01)
*G01S 17/00* (2006.01)
*G01S 17/89* (2006.01)
*G06K 9/00* (2006.01)
*G01B 11/25* (2006.01)
*H04N 5/33* (2006.01)

(52) U.S. Cl.
CPC ............ *G01S 17/89* (2013.01); *G01B 11/2513* (2013.01); *G01S 17/003* (2013.01); *G06K 9/00201* (2013.01); *G06K 9/00838* (2013.01); *H04N 5/33* (2013.01)

(58) Field of Classification Search
CPC ................................. H04N 5/33; H04N 5/332
See application file for complete search history.

(56) References Cited

U.S. PATENT DOCUMENTS

| 6,812,980 | B2* | 11/2004 | Karman ........................ 349/106 |
| 7,075,576 | B2* | 7/2006 | Creasey et al. ............... 348/311 |
| 7,515,767 | B2* | 4/2009 | Miller et al. .................. 382/274 |
| 8,411,938 | B2* | 4/2013 | Zhang et al. .................. 382/162 |
| 8,477,192 | B2* | 7/2013 | Capello et al. ................ 348/148 |
| 8,478,480 | B2* | 7/2013 | Mian et al. .................. 250/316.1 |
| 8,587,657 | B2* | 11/2013 | Wang et al. ................... 348/148 |
| 8,811,664 | B2* | 8/2014 | Dalal et al. .................... 382/103 |
| 2007/0228259 | A1* | 10/2007 | Hohenberger .......... 250/214 LA |
| 2009/0309974 | A1* | 12/2009 | Agrawal et al. ............... 348/159 |
| 2010/0171821 | A1* | 7/2010 | Jacobsen et al. ................ 348/68 |
| 2012/0062697 | A1* | 3/2012 | Treado et al. ................... 348/42 |
| 2013/0147959 | A1* | 6/2013 | Wang et al. ................... 348/149 |
| 2013/0222551 | A1* | 8/2013 | Shamir et al. ................... 348/47 |

OTHER PUBLICATIONS

Wang et al. "Determining a Total Number of People in an IR Image Obtained Via an IR Imaging System", U.S. Appl. No. 12/967,775, filed on Dec. 14, 2010.

(Continued)

*Primary Examiner* — Christopher S Kelley
*Assistant Examiner* — Christopher Findley
(74) *Attorney, Agent, or Firm* — Philip E. Blair; Fleit Gibbons Gutman Bongini & Bianco P.L.

(57) ABSTRACT

What is disclosed is a method which combines structured illumination in the SWIR wavelength range with the detection capabilities of NIR to generate a 3D image of a scene for accurate vehicle occupancy determination. In one embodiment, structured light is projected through a customized optical element comprising a patterned grid. Wavelengths of the received structured pattern are shifted to a CCD detectable range. The shifted light comprises an image in a structured pattern. The wavelength-shifted light is detected using an infrared detector operating in the NIR. For each pixel in the detected patterned image, an amount of distortion caused by 3D surface variation at this pixel location is determined. The distortion is converted to a depth value. The process repeats for all pixels. A 3D image is constructed using each pixel's depth value. The number of occupants in the vehicle is determined from the constructed 3D image.

14 Claims, 11 Drawing Sheets

(56) References Cited

OTHER PUBLICATIONS

Wang et al. "Determining a Number of Objects in an IR Image", U.S. Appl. No. 13/086,006, filed on Apr. 13, 2011.

Jason Geng "Structured-Light 3D Surface Imaging: A Tutorial", Advances in Optics and Photonics vol. 3, Optical Society of America, Mar. 31, 2011, pp. 128-160.

\* cited by examiner

# 3D IMAGING USING STRUCTURED LIGHT FOR ACCURATE VEHICLE OCCUPANCY DETECTION

TECHNICAL FIELD

The present invention is directed to systems and methods which combine a structured illumination source in the short wave infrared (SWIR) wavelength range with the detection capabilities of near infrared (NIR) devices to generate a 3D image of a motor vehicle traveling in a HOV/HOT lane for accurate determination of the number of occupants in that vehicle.

BACKGROUND

It is well established that motor vehicles carrying multiple passengers reduces fuel consumption, highway congestion, pollution, and the like. Highway authorities provide incentives for high occupancy vehicles which include allowing such vehicles to travel in restricted traffic lanes. Penalties are imposed on drivers of vehicles travelling with less than a defined number of occupants (e.g., less than 2). Efforts have been directed towards image capture systems and methods to effectuate HOV lane enforcement. Manual enforcement of HOV/HOT lanes by law enforcement can be difficult and potentially hazardous. Pulling violating motorists over to issue tickets tends to disrupt traffic and can become a safety hazard for both the officer and the vehicle's occupants. Consequently, occupancy detection systems which automatically detect the number of human occupants in a motor vehicle are desirable. Development is ongoing as methods are needed to analyze images captured of moving motor vehicles to determine the number of occupants in that vehicle.

To detect human occupants in the visible wavelength range, intrinsic properties, such as shape, color, and features such as, for example, head shape, eyes, etc., have been utilized. However, these properties are affected by extrinsic factors such as illumination spectrum, illumination variation, similarities of shape and texture, and the like. Active near-infrared (NIR) illumination has been applied to address those extrinsic effects but better performance is still desired in practical applications due to the similarity in reflectance of human skin and other materials, reflected light from windows, stray light from the environment, weather conditions, etc. Since NIR wavelengths are in the CCD range, cameras are available at relatively low cost. However, for imaging through windshields, NIR wavelengths are not very effective. Present single-band infrared cameras use 2D imaging in the NIR wavelength range with a CCD detector array. Whereas, many multiband infrared camera systems use the short wave infrared (SWIR) band by imaging on, for instance, an InGaAs detector array with multiple filters. These systems exploit the physical geometries and material properties at different optical wavelengths in the infrared band. However, such systems lack the ability to capture depth information for 3D image reconstruction. Acquiring a 3D image of a vehicle's occupants increases the accuracy of occupancy determination and thus overall system performance.

Accordingly, what is needed in this art are increasingly sophisticated systems and methods which combine a structured illumination source in the short wave infrared (SWIR) wavelength range with the detection capabilities of near infrared (NIR) devices to generate a 3D image of a motor vehicle traveling in a HOV/HOT lane for accurate determination of the number of occupants in that vehicle.

INCORPORATED REFERENCES

The following U.S. patents, U.S. patent applications, and Publications are incorporated herein in their entirety by reference.

"Determining A Total Number Of People In An IR Image Obtained Via An IR Imaging System", U.S. patent application Ser. No. 12/967,775, by Wang et al.

"Determining A Number Of Objects In An IR Image", U.S. patent application Ser. No. 13/086,006, by Wang et al.

"*Structured-Light 3D Surface Imaging: A Tutorial*", by Jason Geng, Advances in Optics and Photonics Vol. 3, pp. 128-160, (Mar. 31, 2011) Optical Society of America.

BRIEF SUMMARY

What is disclosed is a system and method which combines a structured illumination source in the short wave infrared (SWIR) wavelength range with the detection capabilities of near infrared (NIR) to generate a 3D image of a scene for more accurate vehicle occupancy determination. A structured pattern is created by projecting structured light through a customized optical element comprising a patterned grid. Wavelengths of the received pattern are converted to a CCD detectable range using, for example, a phosphor coated converter which shift the received light to a Silicon-based CCD detectable wavelength band (e.g., near 850 nm). The shifted light comprises an image in a structured pattern of reflected source light. The wavelength-shifted light is detected using an infrared detector operating in the near infrared range of 700-1000 nm. For each pixel in the detected patterned image, an amount of distortion caused by 3D surface variation at this pixel location is determined and the distortion is converted to a depth value for this pixel location. The process repeats for all pixels. Thereafter, a 3D image is constructed using each pixel's respective depth value. The number of occupants in the vehicle is determined by an analysis of the constructed 3D image. Advantageously, NIR imaging offers relatively low cost due to Si-based CCD detectors while the SWIR wavelength range (near 1550 nm) offers high transmission through glass. Also illumination in the SWIR band is not visible to human eye and hence is less obstructive to the driver.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
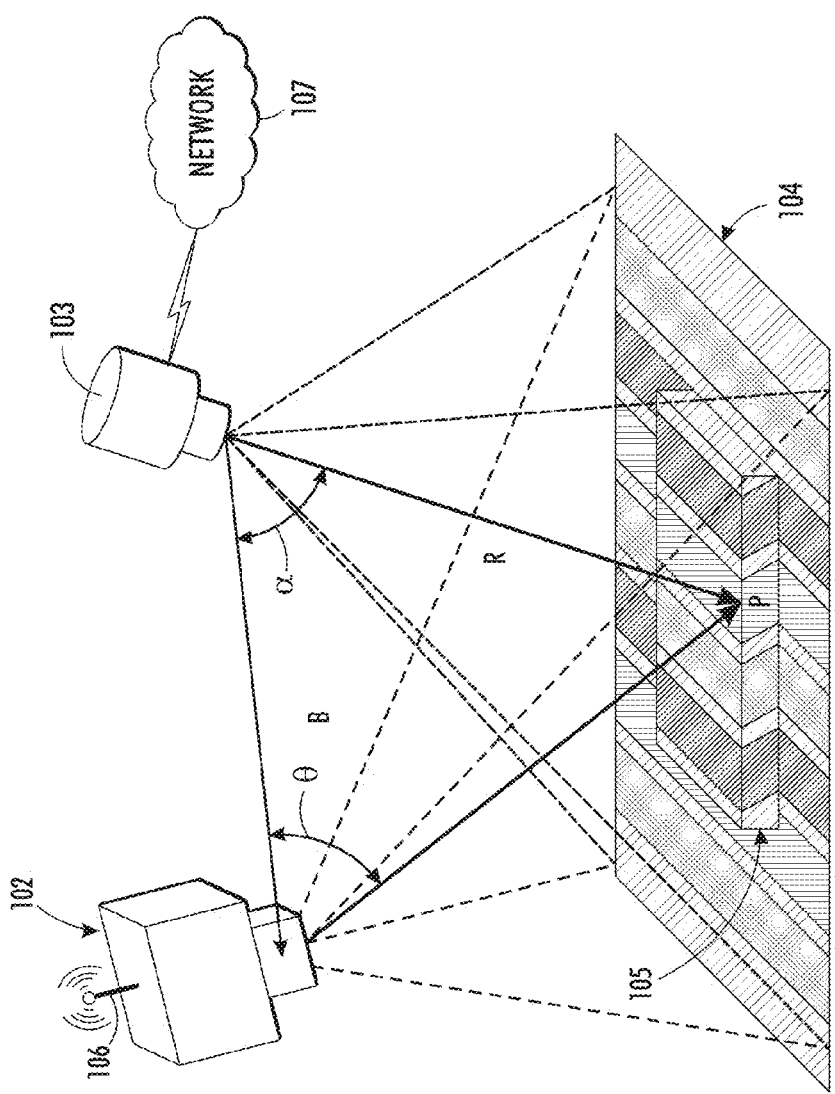
FIG. 1 illustrates geometric relationships between imaging sensor, a structured-light projector, and an object surface point expressed in terms of a triangulation.

What is disclosed is a system and method which combines a structured illumination source in the short wave infrared (SWIR) wavelength range with the detection capabilities of near infrared (NIR) to generate a 3D image of a scene for more accurate vehicle occupancy determination.

NON-LIMITING DEFINITIONS

A "motor vehicle" refers to any motorized vehicle, as is known in the automotive arts, with either an electric motor or an internal combustion engine which burns a fuel such as, for instance, gasoline/petrol, diesel, natural gas, methane, nitromethane, fuel oil, or bio-fuels, including any fuel additives. A motor vehicle further includes vehicles which run on alternative forms of power such as solar, wind, and human power.

An "image of a motor vehicle" means either a still image or a video of a motor vehicle obtained using an IR imaging system. A fully-populated IR image consists of an array of pixels with each pixel having a respective intensity value measured at a desired wavelength range.

An "IR imaging system" is an apparatus comprising an IR illuminator and an IR detector designed to capture IR light reflected from a target object, separate it into its component wavelengths, and output an image of that target.

An "IR detector" is an infrared detection device which measures pixel intensity values at desired wavelength range of interest. An IR detector has a responsivity curve where $\lambda_1$ and $\lambda_2$ specify the wavelength range over which the detector integrates.

An "IR illuminator" is an illumination device which, in various embodiments, comprises a plurality of IR light sources each emitting a narrow band of IR radiation at a respective peak wavelength $(\lambda_1, \ldots, \lambda_n)$. Some illuminators comprise an array of light emitting diodes (LEDs) with each diode being pre-selected to emit radiation at a particular wavelength range within the IR emission band. In various embodiments hereof, the IR illuminator source emits structured light.

A "phosphor-coated converter" is a thin phosphor film coating, such as an anti-Stokes material, that up-converts NIR radiation to visible light measurable by the CCD. The anti-Stokes phosphor coating produces visible photons at a rate roughly the square of the input signal. A semi-transparent phosphor is preferable rather than a diffuse phosphor layer to allow light to pass through with minimal deflection. Such phosphor coated converter devices are available from various vendors in commerce.

A "charge-couple (CCD) device" is a device for the movement of electrical charge, usually from within the device to an area where the charge can be, for example, converted into a digital value. This is achieved by shifting the signals between stages within the device one at a time. CCDs move charge between capacitive bins in the device, with the shift allowing for the transfer of charge between bins. In a CCD image sensor, pixels are represented by p-doped MOS capacitors which are biased above a threshold for inversion when image acquisition begins thereby allowing the conversion of incoming photons into electron charges at the semiconductor-oxide interface. The CCD is then used to read out these charges. Although CCDs are not the only technology to allow for light detection, CCD image sensors are widely used in diverse applications where high-quality image data is required. In applications where a somewhat lower quality can be tolerated, cheaper active pixel sensors are generally employed. In a CCD for capturing images, there is a photoactive region (an epitaxial layer of silicon), and a transmission region made out of a shift register (the CCD, properly speaking). An image is projected through a lens onto the capacitor array (the photoactive region), causing each capacitor to accumulate an electric charge proportional to the light intensity at that location. A one-dimensional array, used in line-scan cameras, captures a single slice of the image, while a two-dimensional array, used in video and still cameras, captures a two-dimensional picture corresponding to the scene projected onto the focal plane of the sensor. Once the array has been exposed to the image, a control circuit causes each capacitor to transfer its contents to its neighbor (operating as a shift register). The last capacitor in the array dumps its charge into a charge amplifier, which converts the charge into a voltage. By repeating this process, the controlling circuit converts the entire contents of the array in the semiconductor to a sequence of voltages. In a digital device, these voltages are then sampled, digitized, and usually stored in memory. In an analog device (such as an analog video camera), these are processed into a continuous analog signal (e.g. by feeding the output of the charge amplifier into a low-pass filter) which is then processed and fed out to other circuits for transmission, recording, or other processing. For further information on CCD devices, the reader is respectfully directed to: "*Scientific Charge-Coupled Devices*", by: James R. Janesick (Author), SPIE Publications, $1^{st}$ Ed. (January 2001) ISBN-13: 978-0819436986, and "*CMOS/CCD Sensors and Camera Systems*", by: Gerald C. Hoist (Author), and Terrence S. Lomheim (Author), Society of Photo Optical; $2^{nd}$ Ed., (March 2011), ISBN-13: 978-0819486530, both of which are incorporated herein in their entirety by reference.

"Structured Light" refers to active illumination of a scene with a specially designed 2D spatially varying intensity pattern. A structured light sensor is similar to a stereoscopic sensor with a camera replaced by a structured light source. Depth is calculated based on a triangulation process of determining a location of a point by measuring angles to it from known points along a triangulation baseline, without measuring the depth directly. The principle of structured-light 3D surface imaging techniques is to extract the 3D surface shape based on the information from the distortion of the projected structured light pattern. Accurate 3D surface profiles of objects in the scene can be computed by using various structured-light principles and algorithms.

A "patterned grid" refers to pattern of projected structured light such as, for example, a dot or line pattern. It should be appreciated that the use of the term dot pattern for explanatory purposes is not to be viewed as limiting the scope of the appended claims solely to structured dot patterns.

Introduction to 3D Surface Variation Determination

The key for triangulation-based 3D imaging is the technique used to differentiate a single projected light spot from the acquired image under a 2D projection pattern. Numerous techniques for surface imaging by structured light are available.

As shown in FIG. 1, a spatially varying 2D structured illumination is generated by a special projector or light source 102 modulated by a spatial light modulator. Light source projector 102 is shown having a communication element 106 which effectuates a bi-directional communication with a remote device, such as a computer workstation or device controller, such that the illumination source can be modulated and an intensity thereof controlled. The intensity of each pixel on the structured-light pattern is represented by a digital signal of the projected pattern. An imaging sensor 103 such as a video camera, for example, is used to acquire a 2D image of the scene 104 under the structured-light illumination. Sensor 103 is in communication with one or more computing devices, such as a workstation, over network 107. If the scene is a planar surface without any 3D surface variation, the pattern shown in the acquired image is similar to that of the projected structured-light pattern (at 104). However, when the surface in the scene is non-planar and contains a 3D object (at 105), the geometric shape of the surface distorts the projected structured-light pattern. Such light distortions can be detected by the camera. The geometric relationship between an imaging sensor 103, a structured-light projector 102, and an object surface point P can be expressed by the triangulation principle as follows:

$$R = B \frac{\sin(\theta)}{\sin(\alpha + \theta)} \quad (1)$$

Figure 2:
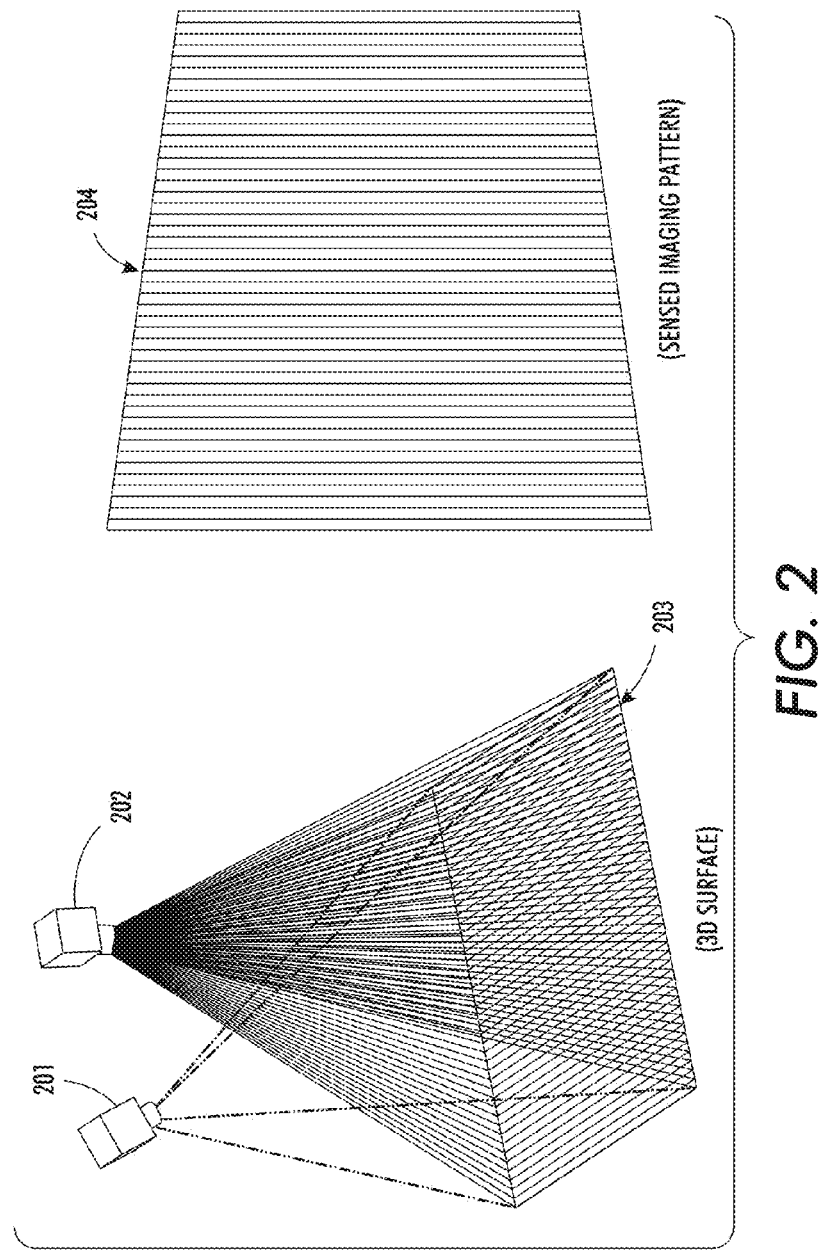
FIG. 2 illustrates a structured light 3D imaging system and a sensed imaging pattern.

FIG. 2 illustrates a structured light 3D imaging system having a camera 201, a structured light projector 202 which projects structured light onto 3D surface 203, and a sensed imaging pattern 204.

Figure 3:
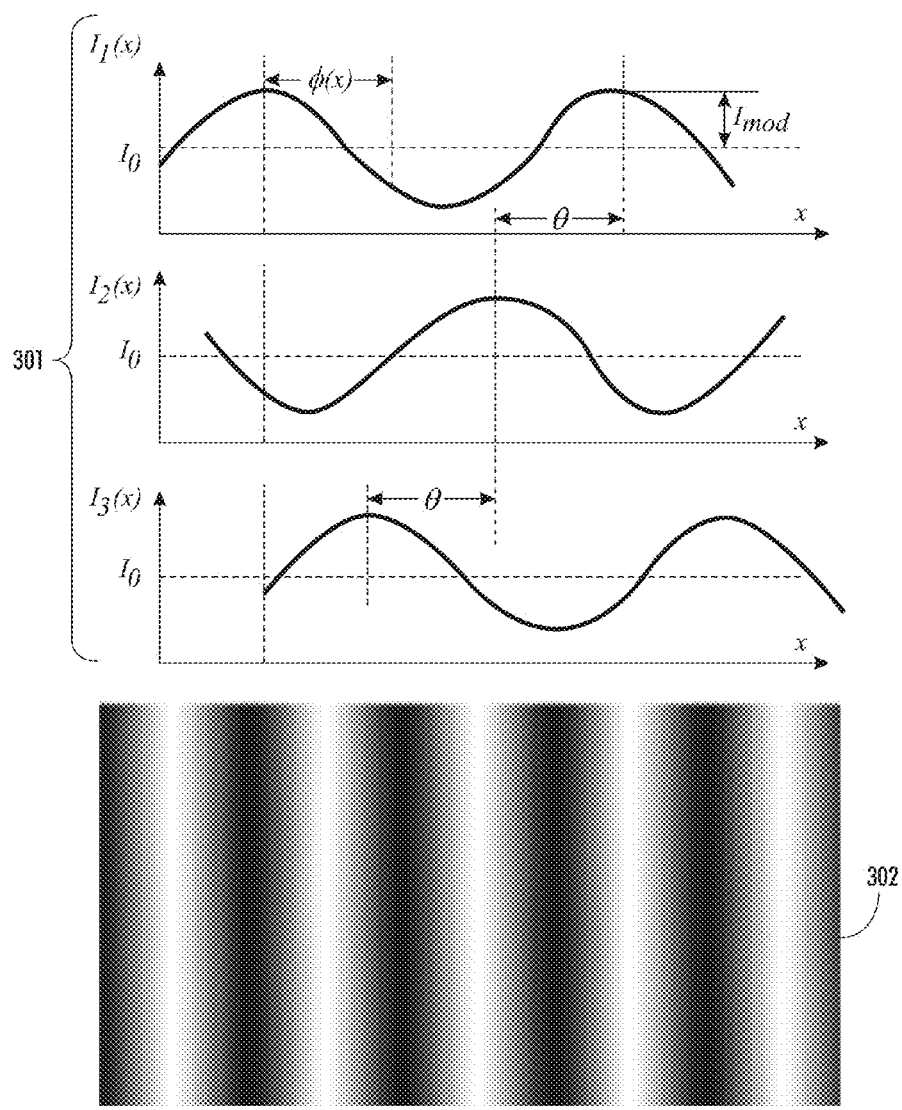
FIG. 3 shows the phase shift with three projection patterns and an example fringe image.

FIG. 3 shows the phase shift with three projection patterns, collectively at 301, projected onto the object surface, and an example fringe image 302. Phase shift is a well-known method wherein intensities for each pixel (x,y) of the three projected fringe patterns are described by the following relationships:

$$I_1(x,y) = I_0(x,y) + I_{mod}(x,y)\cos(\phi(x,y) - \theta)) \quad (2)$$

$$I_2(x,y) = I_0(x,y) + I_{mod}(x,y)\cos(\phi(x,y)), \quad (3)$$

$$I_3(x,y) = I_0(x,y) + I_{mod}(x,y)\cos(\phi(x,y) + \theta), \quad (4)$$

where $I_1(x,y)$, $I_2(x,y)$ and $I_3(x,y)$ are the intensities of three fringe patterns, $I_0(x,y)$ is the DC component (background), $I_{mod}(x,y)$ is the modulation signal amplitude, $\phi(x,y)$ is the phase, and $\theta$ is the constant phase-shift angle. Phase unwrapping is the process that converts the wrapped phase to the absolute phase. The phase information $\phi(x,y)$ can be retrieved (i.e., unwrapped) from the intensities in the three fringe patterns:

$$\phi' = \arctan\left[\sqrt{3} \frac{I_1(x,y) - I_3(x,y)}{2I_2(x,y) - I_1(x,y) - I_3(x,y)}\right] \quad (5)$$

Figure 4:
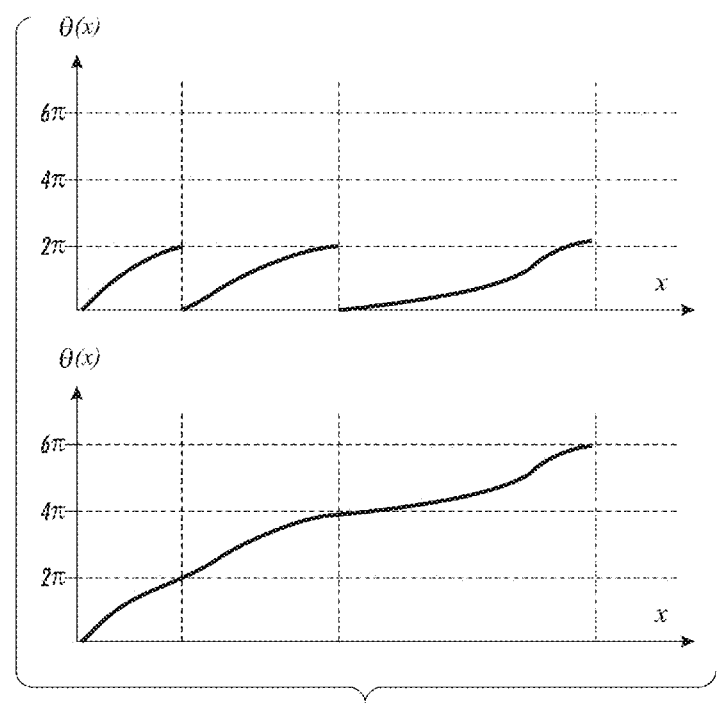
FIG. 4 illustrates one example embodiment of a phase unwrapping process.

The discontinuity of the arc tangent function at $2\pi$ can be removed by adding or subtracting multiples of $2\pi$ on the $\phi'(x,y)$ value (of FIG. 4):

$$\phi(x,y) = \phi'(x,y) + 2k\pi \quad (6)$$

where k is an integer representing projection period. Note that unwrapping methods only provide a relative unwrapping and do not solve for the absolute phase. The 3D (x,y,z) coordinates can be calculated based on the difference between measured phase $\phi(x,y)$ and the phase value from a reference plane.

Another method, known as stripe indexing, can be used to achieve robust 3D surface reconstruction because the order in which the stripes are observed is not necessarily the same as the order in which the stripes are projected due to the inherent parallax existing in triangulation-based 3D surface imaging systems and the possibility to have stripes missing from the acquired image due to occlusion of 3D surface features.

Figure 5:
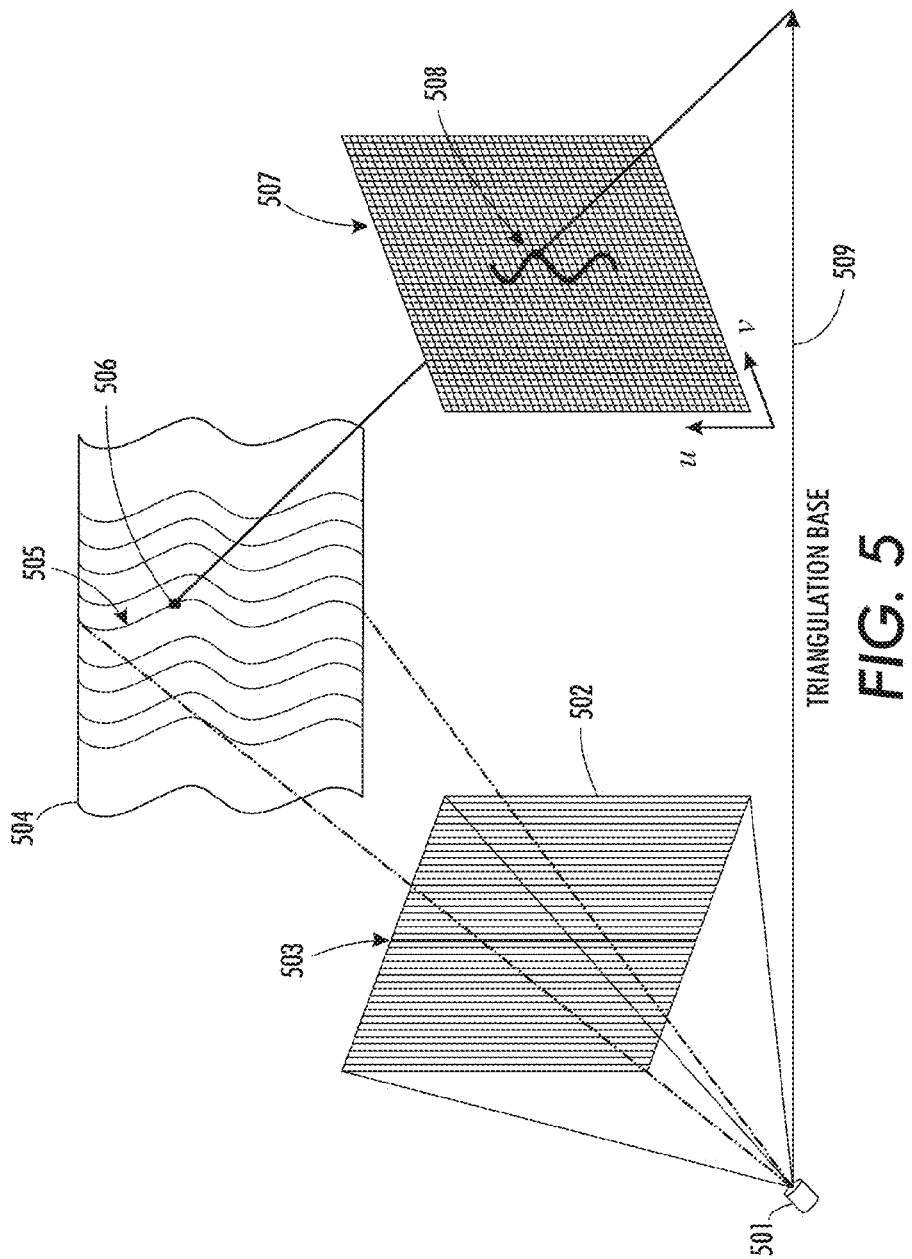
FIG. 5 shows an example stripe projection system.

FIG. 5 shows an example stripe projection system. Structured source light 501 is projected through stripped projector 502 with stripe 503 illustrated for explanatory purposes. The pattern is projected onto object 504 whereon light stripe 505 illuminates the object at pixel location 506. Pixel element 508 of camera matrix 507 detects the reflected source light at this pixel location. The collection of pixels forms the image. Depth is determined based upon a triangulation 509 principle.

Figure 6:
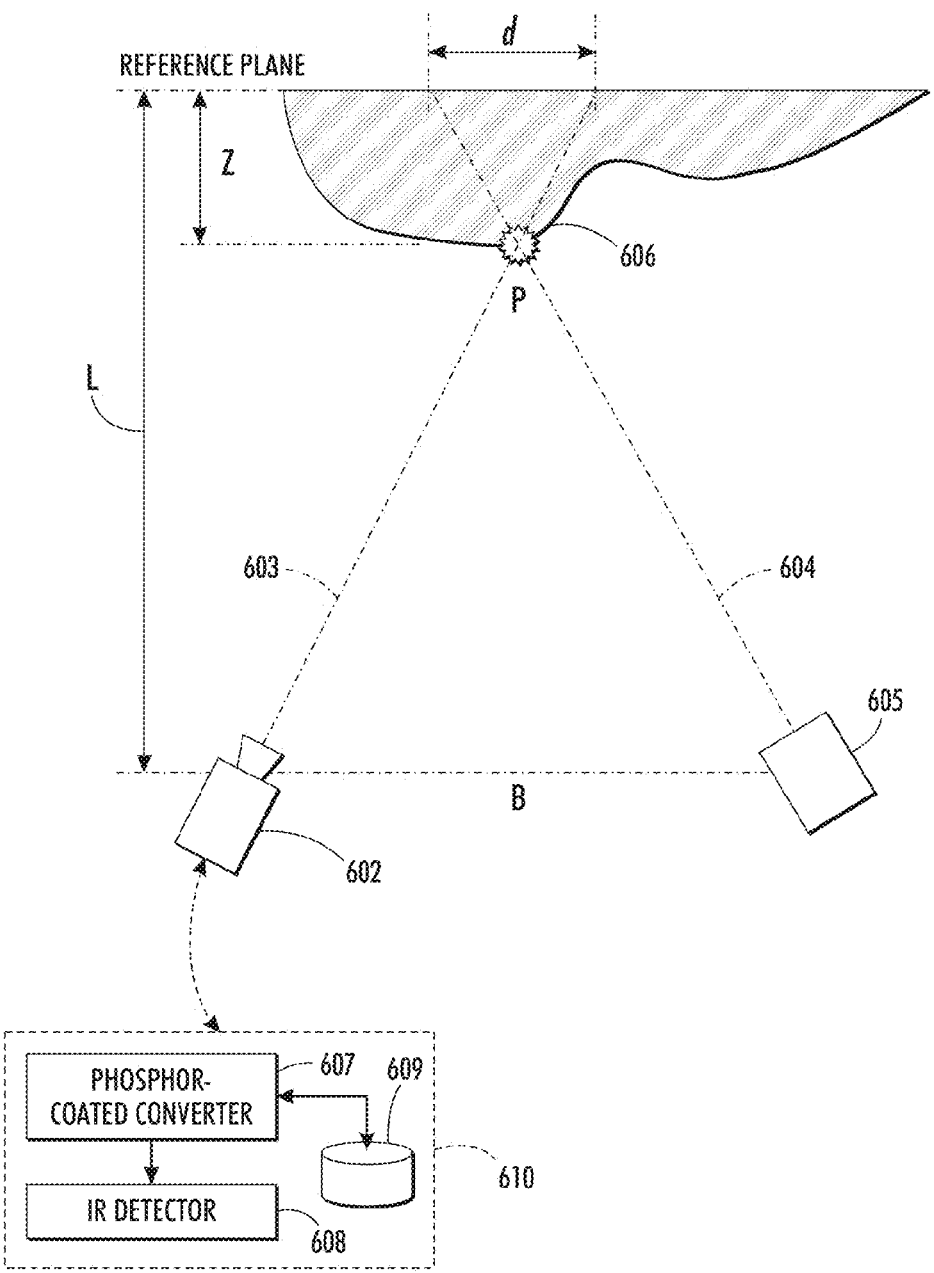
FIG. 6 shows a system which utilizes an image sensor to sense reflected light emitted by patterned source projector in accordance with one embodiment hereof.

FIG. 6 shows a system which utilizes an image sensor 602 to sense reflected light emitted (at 604) by patterned source projector 605. Shown is sensed light 603 being reflected of point P of object 606. Components 610 which, in this embodiment, are internal to sensor 602 contain a phosphor-coated converter 607 which shifts the detected light to a wavelength range of a CCD array of infrared detector 608 which, in turn, detects the wavelength shifted light and generates pixel intensity values for pixel locations in the image. In this embodiment, pixel intensity values and wavelength data are provided to storage media 609. In FIG. 6, the geometries are given by:

$$\frac{Z}{L - Z} = \frac{d}{B}, \text{ or } Z = \frac{L}{B + d}d, \quad (7)$$

which reduces to:

$$Z \approx \frac{L}{B}d \propto \frac{L}{B}(\phi - \phi_0) \quad (8)$$

Figure 7:
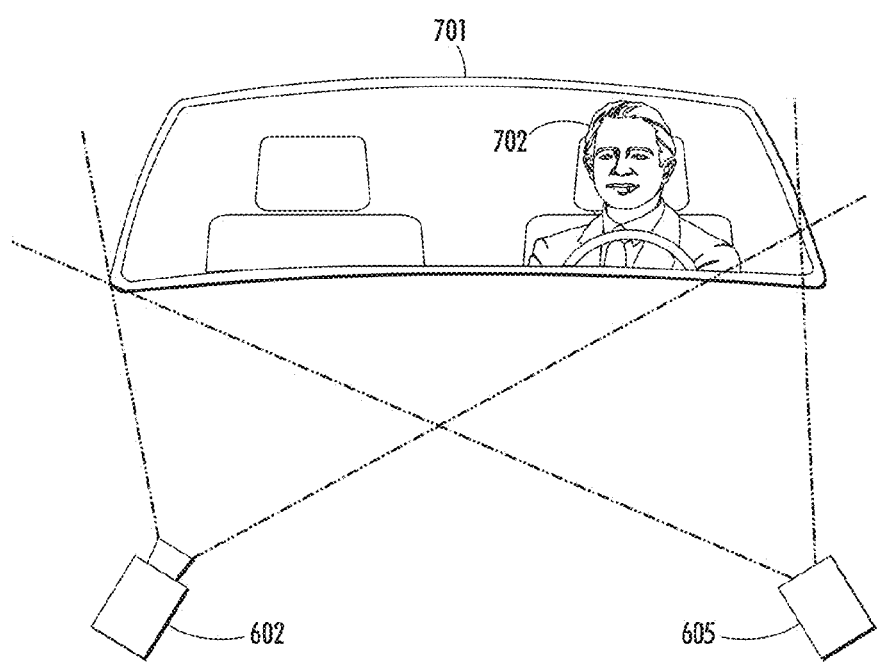
FIG. 7 shows the embodiment of FIG. 6 being utilized in accordance with the teachings hereof to capture image data of motor vehicle traveling in a HOV/HOT lane such that a 3D image of the vehicle's driver can be constructed.

FIG. 7 shows the embodiment of FIG. 6 being utilized in accordance with the teachings hereof to capture image data of motor vehicle 701 traveling in a HOV/HOT lane such that a 3D image of the vehicle's driver 702 can be constructed.

Color imaging sensors usually have three independent acquisition channels, each corresponding to a spectrum band. The linear combination of the values of these color components can produce an infinite number of colors. Three 8-bit channels can represent $2^{24}$ different colors. Use of color for stripe indexing in the projection patterns helps alleviate the ambiguity problem faced by phase-shift or multiple-stripe techniques using monochromatic patterns. This type of color-coded system enables encoding of multiple patterns into a single color projection image with each pattern possessing a unique color value. In order to reduce the decoding error rate, one can select a color set in which each color has a maximum distance from any other color in the set. The maximum number of colors is limited to a distance between colors that generates a minimal crosstalk in the acquired images.

It should be appreciated that if the target 3D object is static and the application does not impose stringent constraints on the acquisition time, multiple-shot (sequential) techniques can be used and may often result in more reliable and accurate results. On the other hand, if the target is moving, single-shot techniques are used to acquire a snapshot 3D surface image of the 3D object at a particular time instance. Single-shot techniques can be classified into techniques using continuously varying structured-light patterns, those using 1D encoding schemes (strip indexing), and those using 2D encoding schemes (grid indexing). Each technique has its own advantages and disadvantages, depending on the specific applications. Some techniques can be combined. For further information on 3D imaging techniques, the reader is respectfully directed to the above-incorporated reference entitled: "*Structured-Light 3D Surface Imaging: A Tutorial*", by Jason Geng.

Example Flow Diagram

Figure 8:
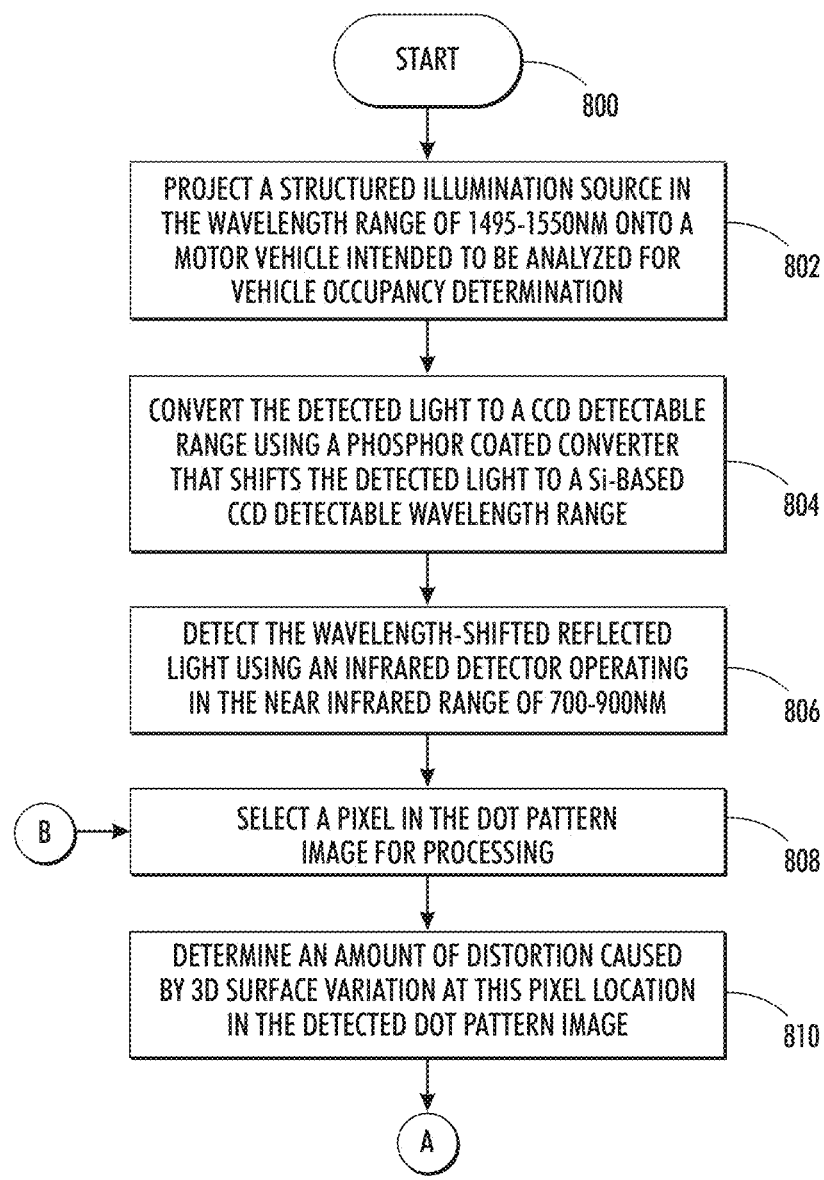
FIG. 8 is a flow diagram of one example embodiment of the present method for 3D imaging of an occupant in a motor vehicle for vehicle occupancy determination.

Reference is now being made to the flow diagram of FIG. 8 which illustrates one example embodiment of the present method for 3D imaging of an occupant in a motor vehicle for vehicle occupancy determination. Flow processing begins at step 800 and immediately proceeds to step 802.

At step 802, project a structured illumination source in the wavelength range of 1495-1550 nm onto a motor vehicle intended to be analyzed for vehicle occupancy determination. The structured light source is projected through a an optical element comprising a patterned grid. One such grid comprising a structured pattern is shown and described with respect to the systems of FIGS. 2 and 5-7. One example motor vehicle being monitored for vehicle occupancy determination is shown in FIG. 7.

At step 804, convert the detected light to a CCD detectable range using a phosphor coated converter. The converter shifts the detected light to a Si-based CCD detectable wavelength range.

At step 806, detect the wavelength-shifted reflected light using an infrared detector operating in the near infrared range of 700-1000 nm. An example converter and IR detector are shown and described with respect to the embodiment of FIG. 6.

At step 808, select a pixel in the patterned image for processing. Pixels can be selected for processing either manually or automatically using, for instance, a row/column selection. A user may use a graphical user interface of a computer workstation to select one or more pixels or regions of pixels in the image for processing.

At step 810, determine an amount of distortion caused by 3D surface variation at this pixel location in the detected patterned image. Various methods for determining a depth value for a given pixel location in a detected image are disclosed herein.

Figure 9:
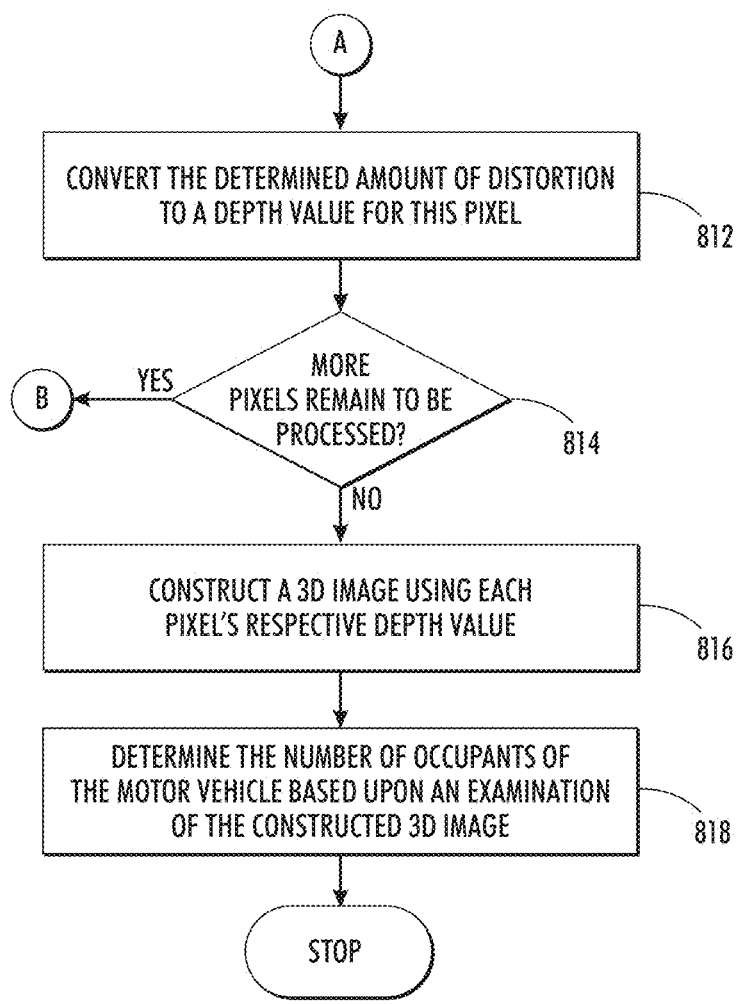
FIG. 9 is a continuation of the flow diagram of FIG. 8 with flow processing continuing with respect to node A.

Reference is now being made to the flow diagram of FIG. 9 which is a continuation of the flow diagram of FIG. 8 with flow processing continuing with respect to node A.

At step 812, convert the determined amount of distortion to a depth value for this pixel. Depth values for a given pixel location can be determined using, for example, the phase shifting technique described with respect to FIGS. 1-4, or the stripe indexing method described with respect to FIG. 5. Software tools such as "Kinect" by Microsoft interpret 3D scene information from projected infrared structured light. The Kinect SDK translates the camera image of projected random dots into a depth image by calculating an amount of a disparity between the projected and camera images. The disparity is derived by matching a segment of the camera image to the portion of the projected image with corresponding random points lined up. Instead of a single pixel in question, a small window around the pixel is compared to improve the accuracy of the matching algorithm. Thereafter, the horizontal translation or disparity is converted to depth information through system calibration. The dominant wavelength for laser light source is about 830 nm. Due to the lower transmission of side window of a motor vehicle at that wavelength, the intensity of the laser dot decreases significantly by passing through the side window twice (in and out). Given that the transmission of the side window at 830 nm to 1500 nm is approximately 20% and 40%, respectively, the remaining light detected on the sensor is about 4% and 16% of incident light after passing through the side window twice. Thus, it would be reasonable to use eye-safe laser light at SWIR wavelengths for increasing transmission and the convert it back to the NIR for detecting with a less expensive CCD array.

At step 814, a determination is made whether any more pixels remain to be processed. If so then processing repeats with respect to node B wherein, at step 808, a next pixel in the detected pattern is selected for processing. An amount of distorted light is determined at this pixel location and the distortion is converted to a depth value. Processing repeats in such a manner until all desired pixels have been selected and processed. Once a depth value has been obtained for each selected pixel and no more pixels remain to be selected then processing continues with respect to step 816.

Figure 10:
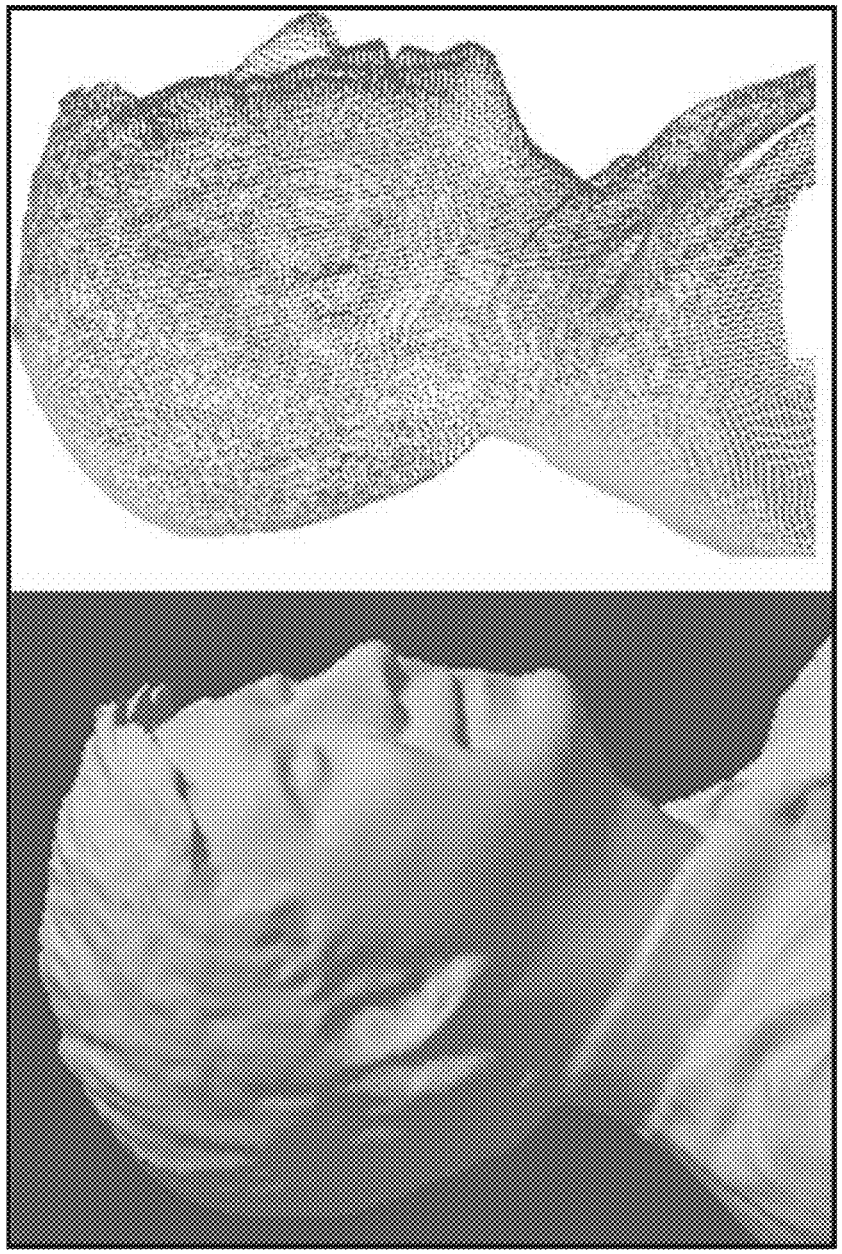
FIG. 10 shows an example of 3D image constructed from pixel depth values.

At step 816, construct a 3D image using each pixel's respective depth value. One example 3D image of the head and facial area of the driver 702 of motor vehicle 701 of FIG. 7, is shown by way of example in FIG. 10. The constructed 3D image can be communicated to a device such as a workstation for further processing or stored to a storage device.

At step 818, determine the number of occupants in the motor vehicle base upon an examination of the 3D image. Total occupancy determination can be obtained by a visual analysis of the constructed 3D image or using, for example, facial recognition software. In this particular embodiment, further processing stops.

Traffic authorities often require more than two passengers for a given vehicle to be authorized to travel in a given HOV/HOT traffic lane during a particular time of day. Therefore, it should be appreciated that the embodiment described with respect to the flow diagrams of FIGS. 8-9 is intended to be used in those vehicle occupancy detection systems where a traffic violation occurs when the motor vehicle does not contain a prescribed number of passengers.

The flow diagrams depicted herein are illustrative. One or more of the operations illustrated in the flow diagrams may be performed in a differing order. Other operations may be added, modified, enhanced, or consolidated. Variations thereof are intended to fall within the scope of the appended claims. All or portions of the flow diagrams may be implemented partially or fully in hardware in conjunction with machine executable instructions in communication with various components of a vehicle occupancy detection system.

Example Image Processing System

Figure 11:
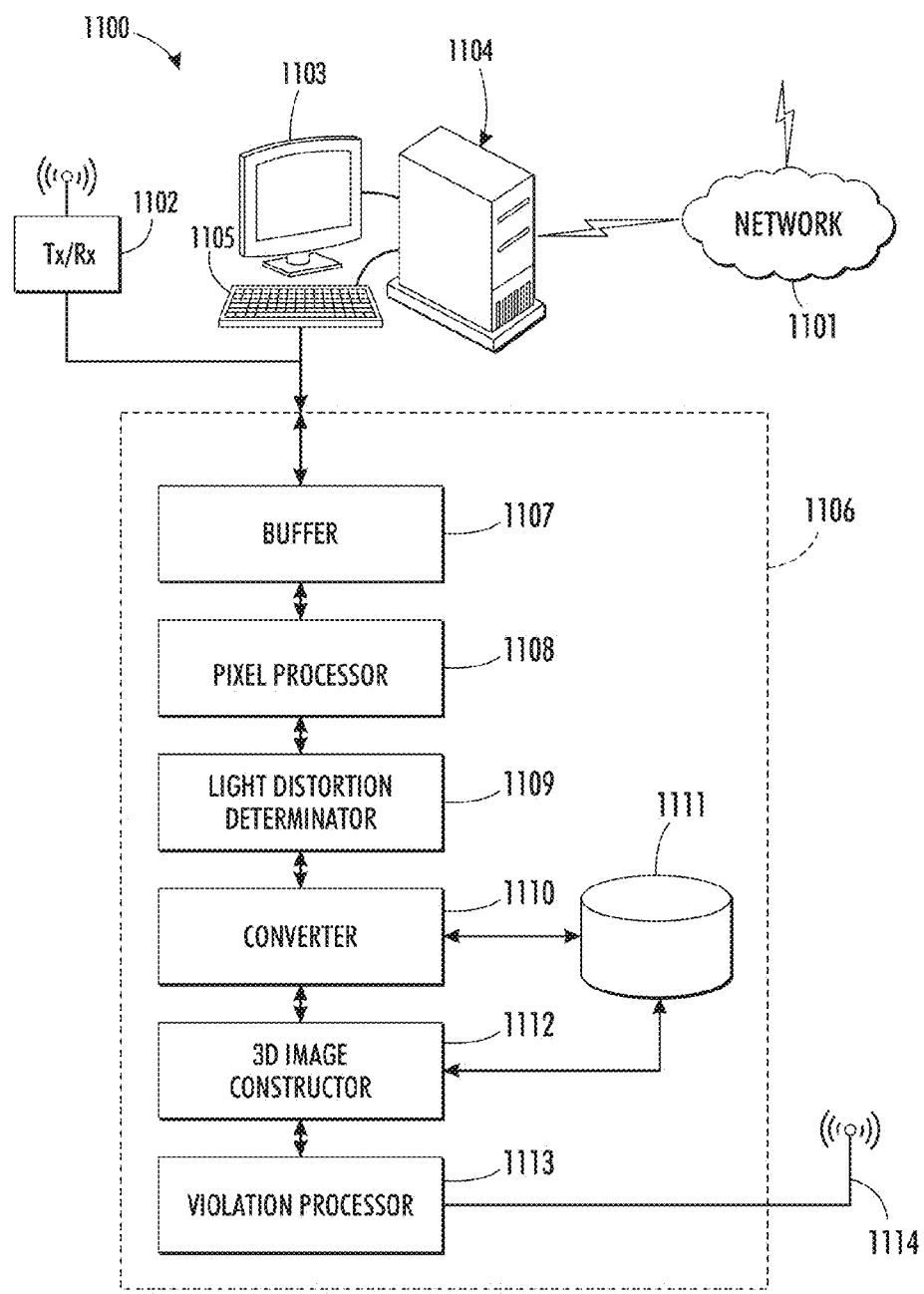
FIG. 11 illustrates a block diagram of one example image processing system for implementing various aspects of the present method as described with respect to the flow diagrams of FIGS. 8 and 9.

Reference is now being made to FIG. 11 which illustrates a block diagram of one example image processing system 1100 for implementing various aspects of the present method as described with respect to the flow diagrams of FIGS. 8 and 9.

In FIG. 11, workstation 1104 is placed in communication with communication element 1102 for receiving detected grid patterns from, for instance, imaging sensor 602 of FIGS. 6 and 7, and for otherwise effectuating communication between various devices and computer workstation 1104 via network 1101. Computer 1104 comprises monitor device 1103 and user interface 1105 for enabling a display of information for a user and for effectuating a user input or selection. An operator of the present vehicle occupancy detection system may use the graphical user interface 1103 to identify or otherwise select pixels and/or a candidate sub-image for processing or re-processing, and provide user input as may be required for the implementation hereof. Pixels and/or regions identified or otherwise detected in the received patterned image may be retrieved from a remote device over network 1101. Various portions of the image may be stored to a memory or storage device 1111 in communication with workstation 1104 or may be communicated to a remote device over network 1101 via a communications interface (not shown) for remote storage or further processing. Workstation 1104 and communications interface 1102 are in communication with Image Processing Unit 1106 for processing the image in accordance with the teachings hereof.

In the embodiment of FIG. 11, Image Processing Unit 1106 is shown comprising a buffer 1107. Such a buffer may be used for queuing information about the received image such as, for instance, regions of interest within the image, size of the image, time/date and the like. The buffer may be configured to also store data, mathematical formulas and other representations to facilitate processing of the image in accordance with the teachings hereof. Pixel Processor 1108 selects pixels in the detected patterned image for processing. Selected pixels are provided to Light Distortion Determinator 1109 which determines an amount of distortion in the received patterned image caused by 3D surface variation at this pixel location. Converter 1110 converts the determined amount of light distortion to a depth value for the selected pixel and stores the depth values for each pixel location to storage device 1111. 3D Image Constructor 1112 retrieves the depth values computed for each pixel from device 1111 and constructs a 3D image from each pixel's respective depth value. Violation Processor 1113 receives the constructed 3D image and proceeds to analyze the image to determine the number of occupants in the image. Information as required to perform any of the functions of any of the modules may be retrieved from storage device 1111 or may be received via a user input using the user interface of workstation 1104. In other embodiments, Violation Processor 1113 determines whether a HOV/HOT violation has occurred based on the lane being traveled, the time of day, and the detected number of occupants in the motor vehicle. Processor 1113 is in communication with transmitter 1114 which effectuates a communication to a law enforcement authority. Such a communication may take the form of providing some or all of the original IR image of the motor vehicle or some or all of the candidate sub-image to the authorities for possible follow-up investigations or the issuance of a ticket for a traffic violation. Such a signal may further be transmitted to a law enforcement agency so that the motor vehicle can be stopped for a visual verification of the number of occupants in that vehicle. The image may be displayed on the display device of an operator of the vehicle occupancy detection system, such as that of workstation 1104, for visual verification and further processing. Facial detection algorithms and software may be retrieved from memory device 1111 such that a facial detection is performed on the received captured image.

Any of the modules hereof are in communication with monitor 1103 to present thereon information for a user selection. Various information such as variables, and the like, are stored and/or retrieved from storage device 1111. Any of the modules and/or processing units of FIG. 11 are in communication with storage device 1111 via pathways shown and not shown and may store/retrieve data, parameter values, functions, pages, records, and machine readable/executable program instructions required to perform their various functions. Each of the modules and processing units of Image Processing System 1106 is also in communication with workstation 1104 via pathways not shown and may further be in communication with one or more remote devices over network 1101. It should be appreciated that some or all of the functionality for any of the modules may be performed, in whole or in part, by components internal to the workstation.

Various modules of the embodiments hereof may designate one or more components which may, in turn, comprise software and/or hardware designed to perform the intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or image processing system embodying executable program instructions capable of performing the methodology described in the flow diagrams.

Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for 3D imaging of an occupant in a motor vehicle for vehicle occupancy determination, the method comprising:
projecting an illumination light source onto a motor vehicle intended to be analyzed for vehicle occupancy determination, said illumination source comprising structured light in the Short Wave Infrared (SWIR) band, said structured light being projected through an optical element comprising a patterned grid, a reflection of said source light being sensed by an imaging sensor;
capturing said projected pattern by said imaging sensor;
calibrating said captured projected pattern comprising:
determining a relationship between actual intensity of said projected pattern and pixel intensity values;
fitting said established relationship with a high order polynomial function;
calculating an inverse function; and
using said inverse function to rectify said pattern;
shifting sensed reflected source light of said captured rectified pattern to a wavelength range of a charge-coupled device (CCD), said wavelength-shifted light being an image in a structured pattern;
using an infrared detector operating in the near infrared range of 700-1000 nm to detect said wavelength-shifted light;
for each pixel in said structured patterned image:
analyzing said detected wavelength-shifted light to determine an amount of distortion caused by 3D surface variation at this pixel location; and
converting said distortion to a depth value for this pixel;
constructing a 3D image using each pixel's respective depth value; and
determining a number of occupants in said vehicle by analyzing said 3D image.

2. The method of claim 1, wherein said Short Wave Infrared band is tuned to an available wavelength converter range of 1495 to 1550 nm.

3. The method of claim 1, wherein wavelengths of said pattern are converted to a CCD detectable range using a phosphor coated converter which shifts the received light to a Si-based CCD detectable wavelength range.

4. The method of claim 1, wherein, in order to enhance a contrast, an intensity curve of said illumination projector is altered with a gamma transformation.

5. The method of claim 1, further comprising calibrating said light source to recover the linearity of illumination intensity.

6. The method of claim 1, further comprising determining whether a traffic violation has occurred based upon said determined number of occupants.

7. The method of claim 6, further comprising alerting an authority in the instance wherein a traffic violation has occurred.

8. A system for 3D imaging of an occupant in a motor vehicle for vehicle occupancy determination, the system comprising:
an illumination light source comprising structured light in the Short Wave Infrared (SWIR) band, said structured light being projected through an optical element comprising a patterned grid;
an imaging sensor for sensing a reflection of said light source;
an infrared detector operating in the near infrared range of 700-1000 nm; and
a processor in communication with a memory for executing machine readable instructions for performing:
capturing said projected pattern by said imaging sensor;
calibrating said captured projected pattern comprising:
determining a relationship between actual intensity of said projected pattern and pixel intensity values;
fitting said established relationship with a high order polynomial function;
calculating an inverse function; and
using said inverse function to rectify said pattern;
shifting sensed reflected source light of said captured rectified pattern to a wavelength range of a charge-coupled device (CCD), said wavelength-shifted light being an image in a structured pattern;
using an infrared detector operating in the near infrared range of 700-1000 nm to detect said wavelength-shifted light;
for each pixel in said structured patterned image:
analyzing said detected wavelength-shifted light to determine an amount of distortion caused by 3D surface variation at this pixel location; and
converting said distortion to a depth value for this pixel;
constructing a 3D image using each pixel's respective depth value; and
determining a number of occupants in said vehicle by analyzing said 3D image.

9. The system of claim 8, wherein said Short Wave Infrared band is tuned to an available wavelength converter range of 1495 to 1550 nm.

10. The system of claim 8, wherein wavelengths of said pattern are converted to a CCD detectable range using a phosphor coated converter which shifts the received light to a Si-based CCD detectable wavelength range.

11. The system of claim 8, wherein, in order to enhance a contrast, an intensity curve of said illumination projector is altered with a gamma transformation.

12. The system of claim 8, further comprising calibrating said light source to recover the linearity of illumination intensity.

13. The system of claim 8, further comprising determining whether a traffic violation has occurred based upon said determined number of occupants.

14. The system of claim 13, further comprising alerting an authority in the instance wherein a traffic violation has occurred.

* * * * *